United States Patent [19]

Green

[11] 3,819,575
[45] June 25, 1974

[54] FLAME RETARDANT COMPOSITIONS

[75] Inventor: Joseph Green, East Brunswick, N.J.

[73] Assignee: Cities Service Company, New York, N.Y.

[22] Filed: Apr. 30, 1971

[21] Appl. No.: 139,257

[52] U.S. Cl.. 260/45.75 R, 260/45.7 R, 260/45.8 N
[51] Int. Cl............................................................ C09k 3/28
[58] Field of Search. 260/DIG. 24, 45.8 N, 45.75 B; 117/136, 137; 252/8.1

[56] References Cited
UNITED STATES PATENTS

| | | | |
|---|---|---|---|
| 2,461,538 | 2/1949 | Fischer | 260/28 |
| 2,549,060 | 4/1951 | Creely | 117/137 |
| 2,912,356 | 11/1959 | Schmerling | 260/648 |
| 2,955,141 | 10/1960 | Schmerling | 260/648 |
| 3,093,599 | 6/1963 | Mueller-Tamm et al. | 260/2.5 |
| 3,133,038 | 5/1964 | Hahn | 260/41 |
| 3,385,819 | 5/1968 | Gouinlock, Jr. | 260/45.75 |
| 3,396,201 | 8/1968 | Weil et al. | 260/648 |
| 3,403,036 | 9/1968 | Hindersinn et al. | 106/18 |
| 3,418,263 | 12/1968 | Hindersinn et al. | 260/23 |
| 3,419,518 | 12/1968 | Mahling et al. | 260/41 |
| 3,511,796 | 5/1970 | Wright | 260/2.5 |
| 3,530,090 | 9/1970 | Savides | 260/45.8 |
| 3,591,507 | 7/1971 | Drake et al. | 252/8.1 |
| 3,660,344 | 5/1972 | Michael et al. | 260/37 |
| 3,681,281 | 8/1972 | Juelke et al. | 260/45.8 |

*Primary Examiner*—Donald E. Czaja
*Assistant Examiner*—R. A. White
*Attorney, Agent, or Firm*—Richard S. Strickler; Elton F. Gunn; Patricia J. Hogan

[57] ABSTRACT

Compositions are disclosed which comprise a thermoplastic polyolefin polymer, an organohalide fire retarding agent, and a triazine as a bloom inhibitor. Preferred bloom inhibitors include melamine, melamine resins obtained when formaldehyde is condensed with melamine, melamine pyrophosphate salts, and substitution products of melamine. A metal compound synergist such as antimony oxide is preferably included.

1 Claim, No Drawings

FLAME RETARDANT COMPOSITIONS

BACKGROUND OF THE INVENTION

This invention relates to flame retarded thermoplastic polyolefin polymers. More particularly, it relates to thermoplastic polyolefin polymers, such as polyethylene or polypropylene, which contain an organohalide compound as the fire retarding agent and a triazine as a bloom inhibitor.

It is known that thermoplastic polyolefin polymers may be rendered flame resistant or flame retardant by the inclusion of various organohalide compounds, several of which are disclosed in U.S. Pat. Nos. 3,385,819; 3,456,022; 3,527,722; 3,530,083; 3,530,030; and 3,530,164. One problem which may be experienced with the use of organohalide compounds as fire retarding agents in thermoplastics is "bloom;" i.e. the fire retarding agent migrates through the polymer and forms an exudate on the polymer surface. This causes a dulling of the surface, with a reduction in glass, thereby ruining the aesthetics of a plastic article, especially when colored. The resulting exudate also attracts dirt and moisture, which can be more then aesthetically objectionable, e.g. electrical properties can be detrimentally affected when the polymer is used as insulation for switches, wires, cables, and the like. Another objectionable consequence of bloom is the eventual loss of the fire retarding agent from the polymer to the extent than it is no longer adequately flame retardant, and such loss in flame retardancy is even further aggravated when the composition is subjected to repeated flexing or wearing actions which cause the flame retarding agent to be separated from the polymer surface, e.g. when the composition is a carpet tufting made of polypropylene fiber.

SUMMARY OF THE INVENTION

It has now been discovered that triazines, such as melamine and derivations thereof, are effective bloom inhibitors in a thermoplastic polyolefin polymer which has been rendered flame retardant by means of an organohalide fire retarding agent.

Broadly, this invention is thermoplastic polyolefin polymers which contain an effective amount of an organohalide fire retarding agent and a triazine bloom inhibitor. A metal compound synergist such as antimony oxide is preferably included.

DESCRIPTION OF THE INVENTION

Any suitable triazine can be employed in the practice of the present invention. Representative triazines which can be employed include melamine, products obtained when formaldehyde is condensed with melamine, acid salts of melamine, particularly melamine pyrophosphate, substitution products of melamine, and particularly those substitution products wherein the hydrogens of the melamine have been replaced by methylol groups. The use of melamine (2,4,6-triamino-1,3,5 triazine) as a bloom inhibitor is especially preferred, but other triazine derivative of melamine which can be employed include hexamethylol melamine, melamine pyrophosphate, and products which result from condensation of formaldehyde with melamine, e.g. formaldehyde/melamine resins. The term "triazine derivatives of melamine" is intended, therefore, to mean derivatives of melamine wherein the triazine ring structure having 3 carbon and 3 nitrogen atoms has been preserved; and, in materials other than melamine, wherein members or groups have replaced at least part of the hydrogen in the amino groups of melamine.

The amount of triazine which should be incorporated into the flame retardant thermoplastic polymer is subjected to considerable variation depending upon the particular triazine employed, the type of polyolefin polymer into which it is incorporated, and the type and amount of fire retarding agent employed. Generally, an amount of triazine which is within the range of about 0.1 to about 5 percent of the total weight of the composition will inhibit bloom, but greater or lesser amounts can be employed where indicated, and an optimum amount of a specific triazine can be determined from simple experiments suggested by the teachings of this disclosure and which are guided by the good judgment of one skilled in the art.

As previously indicated, the purpose of the triazine is to inhibit bloom, i.e. exudation, of the fire retarding agent from the thermoplastic polymer. Desirably, therefore, the inhibitor should be intimately mixed with the polymer and the fire retarding agent. This can be accomplished by conventional mixing techniques, e.g. in an extruder, a Banbury, or on a roll-mill. Other ingredients can also be mixed with the polymer, conveniently at the same time that the triazine is mixed therewith, including the fire retarding agent, and, when preferred, other additives such as a metal compound synergist, a pigment, a plasticizer, a stabilizer, or other preferred materials.

The invention is not limited to use of a particular type of fire retarding agent since the bloom inhibitors claimed are effective with more than one type of halogenated agent. Among those which can be employed are a variety of well-known organohalide fire retarding agents which have the formula R(X)a where R represents a cyclic or acyclic olefin having from about 4 to about 24 carbon atoms, X is chlorine or bromine, and "a" is an integer in the range of about 1 to about 14. Exemplary compounds of this general type include tetrabromo derivatives of 4-vinylcyclohexene, tetrabromocyclooctane, perhalocyclodecanes, such as hexachlorocyclopentadiene dimer, compounds having the structure of a Diels-Alder adduct of a halogenated cyclopentadiene and an unsaturated aliphatic halide, compounds have the structure of a Diels-Alder diadduct or a halogenated cyclopentadiene and an unsaturated aliphatic or cycloaliphatic compound, brominated derivatives of bis(cyclohexenyl)ethylene, tetrabromocyclononanes, and tetrabromo derivatives of 1,7-octadienes. Especially preferred fire retarding agents are brominated derivatives of bis(cyclohexenyl)ethylene and compounds having the structure of a dihalogenated 1:1 Diels-Alder adduct of hexachlorocyclopentadiene and an unsaturated aliphatic or cycloaliphatic bromide. Preferred 1:1 Diels-Alder adducts of the just mentioned type of compound are of the structure

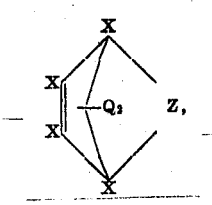

wherein X and Q are chlorine, Z contains a single 8 member ring and 2 bromine atoms. However, other preferred fire retarding agents of this general type are compounds wherein X is a chlorine or bromine, Q is a halogen, hydrogen, hydrocarbyl, or hydrocarboxy group, Z is a divalent hydrocarbyl polybromide having from about 5 to about 16 carbon atoms and from about 2 to about 6 bromine atoms, and wherein the valences are on adjacent carbon atoms and the bromine atoms are substituents on aliphatic or cycloaliphatic carbon atoms. In such cases Z can be a polybromocycloalkylene group, and will preferably contain from 8 to 12 carbon atoms in a single carbocyclic ring and 2 to 4 bromine atoms. Preparation of 1:1 Diels-Alder adducts of cyclopentadienyl polyhalides and unsaturated aliphatic or cycloaliphatic bromides is described in co-pending patent application Ser. No. 115,081 filed Feb. 12, 1971 in the name of Jack Newcombe.

The amount of fire retarding agent which can be employed in the present invention is subject, of course, to wide variation depending upon the type employed, the amount of metal compound synergist such as antimony oxide, if employed, and the degree of flame retardancy sought. Generally, the compositions of this invention will contain about 1 to about 60 weight percent of the fire retarding agent, but greater and lesser amounts can be utilized when it is preferable and practical to do so. It is frequently preferable to minimize the content of additives in the polyolefin polymer in the interest of preserving the physical properties of the pure polymer such as tensile strength, elongation, modulus, color and gloss. Using flame retardants which have been previously referred to herein as especially preferred, nonburable thermoplastic polyolefin polymers can be provided wherein the weight content of the flame retarding agent does not exceed about 30 weight percent, and nonburnable polypropylene may be produced with as little as about 1 weight percent, or less, to about 10 weight percent of these materials.

It has been observed, however, that the tendency to bloom increases as the content of fire retarding agent and metal compound synergist in the composition is reduced, e.g. to a content below 15 weight percent. Bloom can, therefore, be most pronounced when the content of fire retarding additives has been optimized to provide a preselected degree of flame retardancy at the lowest possible loading of the fire retarding agent. While the present invention is directed toward alleviation of this particular problem, it will nonetheless be understood that it is not specifically limited to polyolefin compositions having a low content of fire retarding agent.

As previously indicated, a metal compound synergist is preferably employed in the present compositions for reducing the content of fire retarding agent required therein for achieving a preselected degree of flame retardancy. Well-known compounds of antimony, arsenic and bismuth can be employed for this purpose. Antimony oxide is a preferred synergist.

If the fire retarding agent is unstable at temperatures at which the compositions of this invention are normally processed or used, a stabilizer can also be incorporated in the polymer. Certain organo-tin compounds can be employed as the stabilizer, one example being dibutyl tin bis(isooctyl maleate). Usually only small amounts of this compound, e.g. from about 0.01 to about 3.0 weight percent of the composition, need be used to achieve a substantial improvement in the thermal stability of the fire retarding agent.

EXAMPLE 1

A brominated 1:1 Diels-Alder adduct of polychlorocyclopentadiene and cyclooctadiene-1,5 was prepared as follows.

In a flask, fitted with a stirrer, a thermometer and a reflux condenser was placed 259.6 g. (2.4 moles) cyclooctadiene-1,5 and 81.8 g. (0.3 mole) hexachlorocyclopentadiene. The mixture was heated in twenty minutes to 140°C. and maintained at this temperature for two hours, with stirring. The mixture was then distilled at reduced pressure (100 mm.) to remove the unreacted cyclooctadiene. Near the end of the distillation, with the pot temperature at 100°C., pressure was reduced to 50 mm and then to 25 mm, at which time the pot temperature was increased to 160°C. Vacuum distillation was continued under these conditions for eight hours to remove substantially all the volatiles.

At this time, the more volatile 1:1 adduct was separated from the mixture of 1:1 and 2:1 adducts by reducing the pressure to about 0.5 mm Hg. The 1:1 adduct was removed at an overhead temperature of 138°C.–155°C.

Into a flask fitted with a thermometer, a stirrer and two dropping funnels was placed 100 ml t-butyl alcohol. A heptane solution (133 ml) containing 76.2 g. (0.2 mole) of the 1:1 adduct of hexachlorocyclopentadiene and cyclooctadiene was added simultaneously with 32.8 g. (0.205 mole) bromine over a period of one-half hour. The addition rates were adjusted so that an excess of bromine, noted by the persistence of a characteristic red-brown color, was maintained during the reaction. The reaction temperature was kept at 25°C. After completion of the reaction, stirring was continued for one-quarter hour, followed by the addition of 2.0 g. sodium carbonate, to neutralize excess bromine. After stirring an additional one-half hours, the mixture was filtered, with the resultant filter cake being washed with three separate 150 ml portions of water and three separate 50 ml portions of isopropyl alcohol. The cake was vacuum dried at 50°C., yielding 80.7 g. (74.6 percent yield) of brominated adduct having a melting range 190°C.–193°C. Recrystallization from chloroform gave a product (5,6-dibromo-1,10,11,12,13,13-hexachlorotricyclo[8,2,1,0$^{2,9}$] tridec-11-ene) with a melting range 201°–3°C.

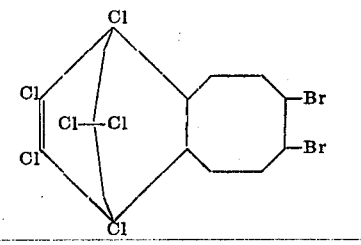

EXAMPLES 2–10

The brominated 1:1 Diels-Alder adduct prepared in Example 1 and the hexabromide of 1,2-bis(3-cyclohexenyl) ethylene were incorporated into polypropylene as fire retarding agents while employing melamine as a bloom inhibitor. Antimony trioxide was employed as a synergist. For testing purposes each composition was compression molded into bars. The amount of each additive is shown in Table I. The length of time till bloom appeared, or failed to appear, is also shown in the table.

TABLE I

| Example | Parts by Weight | | | | | | | | |
|---|---|---|---|---|---|---|---|---|---|
| | 2 | 3 | 4 | 5 | 6 | 7 | 8 | 9 | 10 |
| Polypropylene | 94.89 | 94.89 | 92.76 | 92.76 | 83.3 | 83.3 | 91.7 | 91.7 | 91.7 |
| Brominated 1:1 Diels-Alder Adduct of Example 1 | 0 | 0 | 0 | 0 | 10.5 | 10.5 | 5.2 | 5.2 | 5.2 |
| Hexabromide of 1,2-bis (3-cyclohexenyl) ethylene | 2.74 | 2.74 | 4.16 | 4.16 | 0 | 0 | 0 | 0 | 0 |
| Antimony Trioxide | 1.37 | 1.37 | 2.08 | 2.08 | 5.2 | 5.2 | 2.6 | 2.6 | 2.6 |
| Melamine | 0 | 1.0 | 0 | 1.0 | 0 | 1.0 | 0 | 0.5 | 1.0 |
| Number of Days till Bloom Appeared | <1 | — | <1 | — | <1 | — | <1 | 14 | — |
| Number of Days after which Bloom was not Apparent | — | 90 | — | 90 | — | 90 | — | — | 90 |

The effectiveness of triazines as bloom inhibitors for organohalide flame retarding agents in thermoplastic polyolefin polymers has been demonstrated in the preceding examples. While the invention has been described with reference to particular materials, proportions, procedures, and the like, it will be understood that other embodiments will become apparent which are within the spirit and scope of the invention which is defined in the appended claims.

Therefore, what is claimed is:

1. A bloom-inhibited flame retardant composition comprising:

a. a polypropylene polymer, b. from about 1 to about 30 weight percent, based on the total composition, of an organohalide fire retarding agent selected from the group consisting of the brominated 1:1 Diels-Alder adduct of hexachlorocyclopentadiene and cyclooctadiene-1,5 and the hexabromo-derivative of bis(cyclohexenyl)-ethylene, c. from about 0.1 to about 5 weight percent melamine, based on the total weight of the composition, and d. antimony trioxide, in which the ratio of the fire retarding agent to antimony trioxide is about 2.

* * * * *